US010883383B1

(12) United States Patent
Ivakitch et al.

(10) Patent No.: US 10,883,383 B1
(45) Date of Patent: Jan. 5, 2021

(54) MULTI-FILM DAMPER RINGS WITH SPACERS

(71) Applicant: PRATT & WHITNEY CANADA CORP., Longueuil (CA)

(72) Inventors: Richard Ivakitch, Scarborough (CA); David Beamish, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/657,112

(22) Filed: Oct. 18, 2019

Related U.S. Application Data

(60) Provisional application No. 62/878,784, filed on Jul. 26, 2019.

(51) Int. Cl.
*F01D 25/16* (2006.01)
*F16C 27/04* (2006.01)

(52) U.S. Cl.
CPC .......... *F01D 25/164* (2013.01); *F16C 27/045* (2013.01); *F05D 2220/32* (2013.01); *F05D 2240/54* (2013.01)

(58) Field of Classification Search
CPC ...... F16C 27/045; F01D 25/16; F01D 25/162; F01D 25/164; F05D 2240/54; F05D 2220/32; F16F 15/0237
See application file for complete search history.

(56) References Cited

U.S. PATENT DOCUMENTS

| 4,214,796 A * | 7/1980 | Monzel ................. F01D 25/164 384/202 |
| 4,289,360 A * | 9/1981 | Zirin ................... F16F 15/0237 384/462 |
| RE31,394 E | 9/1983 | Streifert |

(Continued)

*Primary Examiner* — Alan B Waits
(74) *Attorney, Agent, or Firm* — Norton Rose Fulbright Canada LLP

(57) ABSTRACT

A multi-film oil damper for accommodating radial movement of a rotary shaft bearing relative to a bearing housing, the multi-film oil damper comprising: an annular damper cavity defined within the bearing housing between a radially outward wall, a first radially extending side wall and a second radially extending side wall, the annular damper cavity having an oil inlet in the radially outward wall, the oil inlet being in communication with a source of pressurized oil; an inner damper ring having axial ends abutting the first and second radially extending side walls of the annular damper cavity; a plurality of outer damper rings coaxially nested between the inner damper ring and the radially outward wall, each outer damper ring having axial ends adjacent the first and second radially outward walls of the annular damper cavity, each outer damper ring having a first cylindrical surface and a second cylindrical surface; a plurality of spacer bosses circumferentially spaced apart at each axial end of the plurality of outer damper rings, a contact surface of each spacer boss extending radially beyond the first surface of an associated outer damper ring and engaging the second surface of an adjacent outer damper ring defining an oil filled gap there between; and a radial oil channel (Continued)

through a central portion of the plurality of outer damper rings in fluid communication with the oil inlet.

14 Claims, 4 Drawing Sheets

(56) References Cited

U.S. PATENT DOCUMENTS

| | | | |
|---|---|---|---|
| 4,992,024 A * | 2/1991 | Heydrich | F01D 25/164 384/99 |
| 5,071,262 A | 12/1991 | Monzel et al. | |
| 5,207,511 A | 5/1993 | Bobo | |
| 5,228,784 A | 7/1993 | Bobo | |
| 8,342,796 B2 | 1/2013 | Spencer et al. | |
| 9,879,750 B2 | 1/2018 | Husband et al. | |
| 10,077,713 B2 | 9/2018 | Gysling et al. | |
| 10,233,778 B2 | 3/2019 | Gysling et al. | |
| 2004/0062460 A1 * | 4/2004 | Dusserre-Telmon | F01D 25/18 384/475 |
| 2011/0058759 A1 * | 3/2011 | Herborth | F01D 25/164 384/55 |
| 2016/0040554 A1 * | 2/2016 | Hovhannisian | F01D 25/18 415/170.1 |
| 2018/0128124 A1 | 5/2018 | Avis et al. | |

* cited by examiner

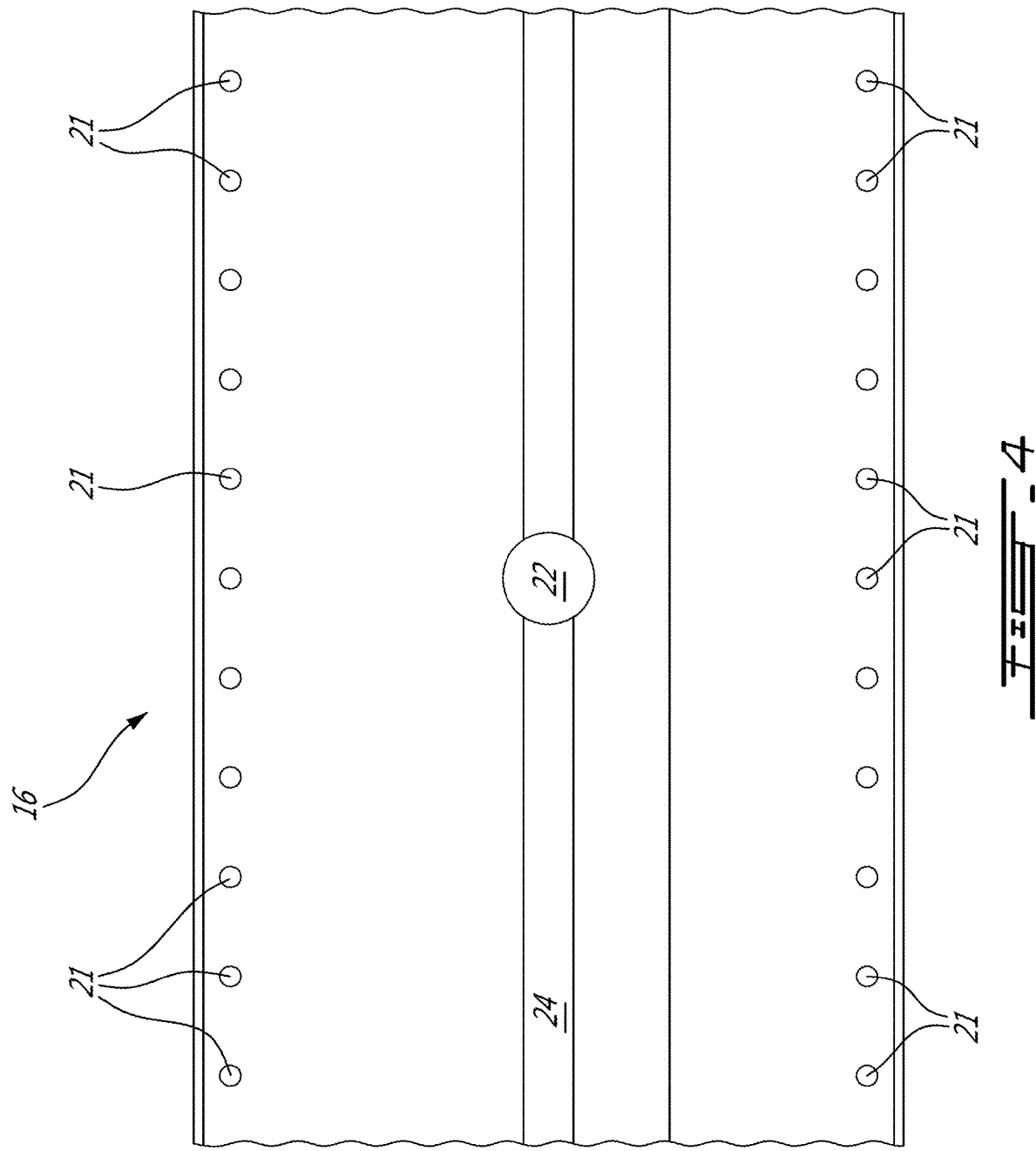

MULTI-FILM DAMPER RINGS WITH SPACERS

CROSS-REFERENCE TO RELATED APPLICATIONS

This application claims priority to U.S. provisional patent application No. 62/878,784 filed Jul. 26, 2019, the entire contents of which are incorporated by reference herein.

TECHNICAL FIELD

The disclosure relates to a multi-film damper system suited for use within a bearing housing of a gas turbine engine.

BACKGROUND

Oil dampers or squeeze film dampers can be used to accommodate radial movement of the rotor shaft and bearings. For instance, multi-film oil dampers may be placed in a coaxial nested series with the rotor system bearing supports to provide damping to a rotor system and, thus, reduce vibrations that would otherwise be present in the system.

For proper function of an oil film damper with multiple films, each of the films between adjacent coaxial nested damper rings must be supplied with sufficient oil. In a multi-film damper, the flow of oil must fill gaps between rings to create individual oil films between each damper ring. Imbalanced rotation of the shaft and bearings will alternately compress and decompress the oil films during damping. A continuous supply flow of pressurized oil is provided to ensure that oil films are maintained.

Under certain conditions, such as during start-up, it might be challenging to provide for a continuous supply flow of pressurized oil so as to ensure that oil films are maintained. Improvement is desirable.

SUMMARY

The disclosure describes a multi-film oil damper in a gas turbine engine, comprising: a housing defining an annular damper cavity having an oil inlet in communication with a source of pressurized oil; a plurality of nested damper rings disposed within the annular damper cavity, the plurality of nested damper rings defining a plurality of squeeze film annuli, the nested damper rings having respective radially inner surfaces and radially outer surfaces; spacer bosses circumferentially spaced-apart between adjacent damper rings of the plurality of nested damper rings, the spacer bosses extending between the radially outer surfaces the radially inner surfaces of the adjacent damper rings; and a radial oil channel in fluid communication between the oil inlet and the plurality of nested damper rings.

In accordance with a further aspect, there is provided a method of supplying oil to a multi-film oil damper comprising: providing a plurality of coaxial nested outer damper rings disposed in an oil damper cavity of a bearing housing and sealed with an inner damper ring, flooding the oil damper cavity with oil via an oil inlet; spacing the coaxial nested outer damper rings apart with spacer bosses to define oil filled gaps therebetween; and providing a radial oil channel through a central portion of the plurality of outer damper rings in fluid communication with the oil inlet.

Further details of these and other aspects of the subject matter of this application will be apparent from the detailed description included below and the drawings.

DESCRIPTION OF THE DRAWINGS

FIG. 4 is an axial sectional view along line 4-4 of FIG. 3 showing the circumferentially spaced apart spacer bosses formed on a cylindrical surface adjacent each axial end of the outer damper rings.

DETAILED DESCRIPTION

Figure 1:
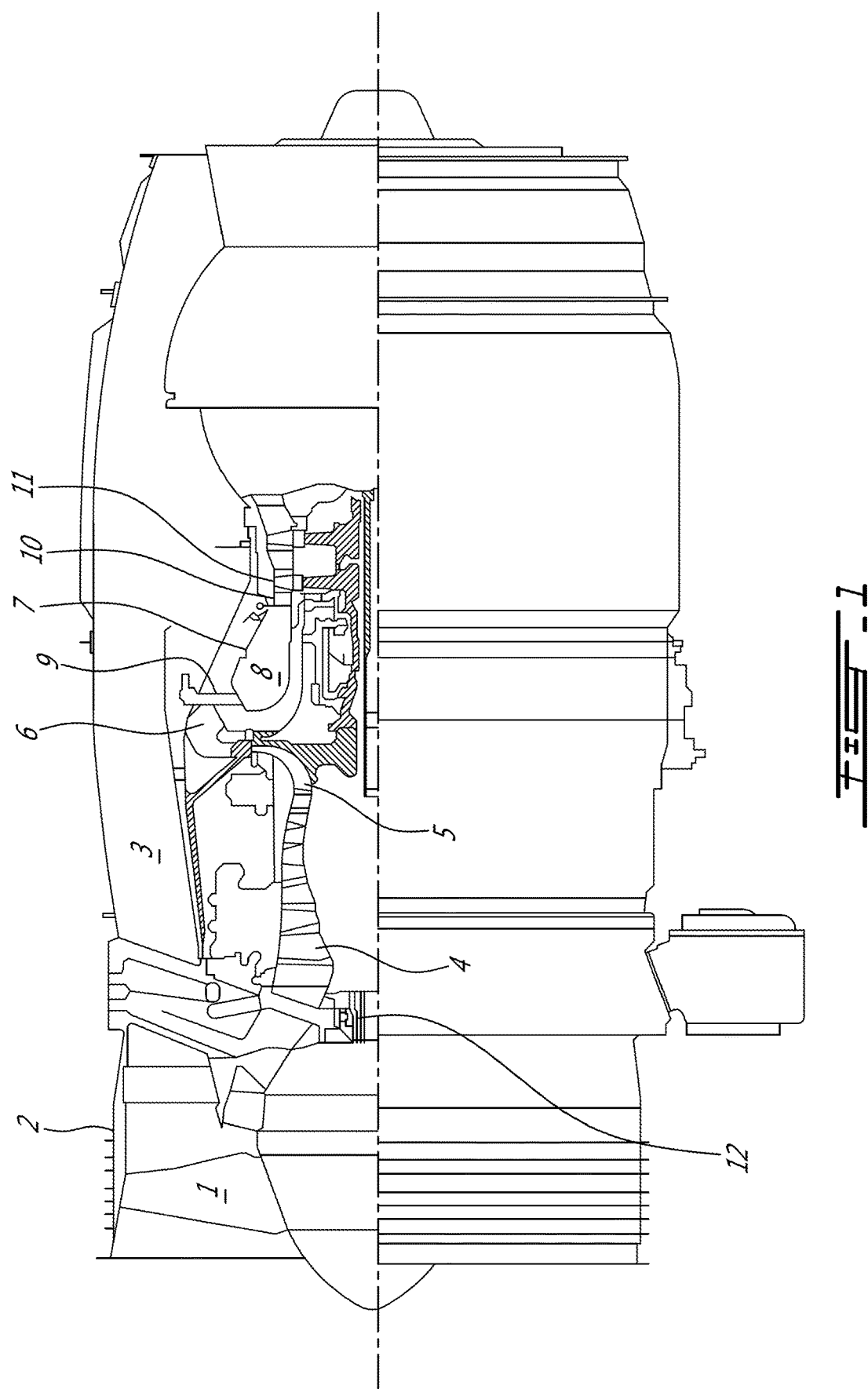
FIG. 1 shows an axial cross-section view of an example turbo-fan gas turbine engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
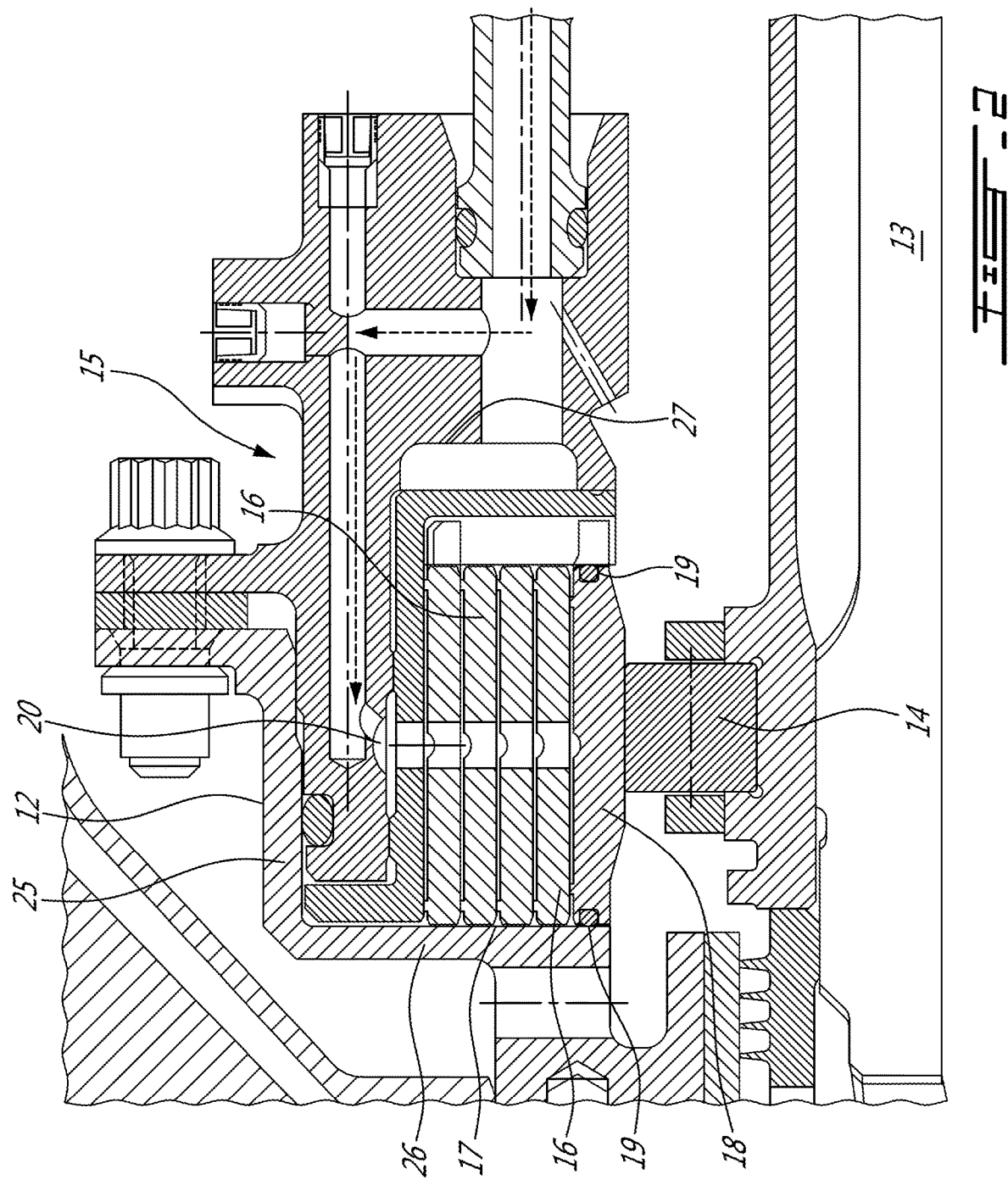
FIG. 2 is a sectional view along an axial radial plane through a multi-film damper in accordance with the present description showing spacer bosses that separate and seal between coaxial nested damper rings.

FIG. 1 shows a forward bearing housing 12. FIG. 2 shows a sectional view along an axial radial plane with the forward bearing housing 12 supporting a low pressure spool shaft 13 on roller bearings 14. FIG. 2 shows an axial section through a multi-film damper 15 in accordance with the present description that accommodates radial movement of the rotary shaft 13 and roller bearings 14 relative to a bearing housing 12. Radial movement is dampened by the oil films between the four outer damper rings 16.

Figure 3:
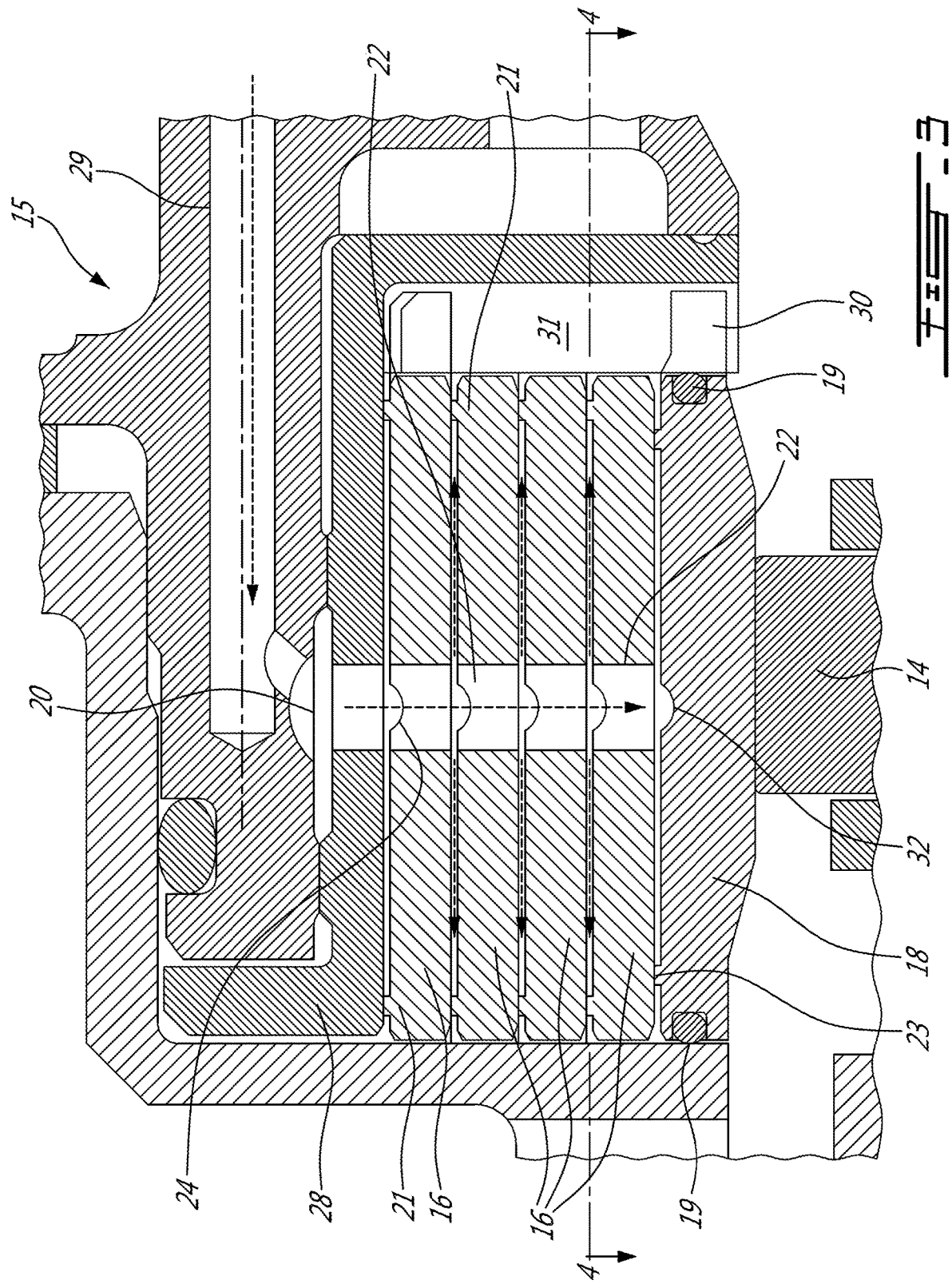
FIG. 3 is a detailed sectional view of the damper of FIG. 2.

As seen in FIG. 3, the multi-film oil damper 15 accommodates radial movement of the rotary shaft 13 and roller bearings 14 relative to the bearing housing 12 using a plurality of coaxial nested outer damper rings 16 disposed in the oil damper cavity 17 of the bearing housing 12. In the example, four outer damper rings 16 are shown however any number can be used. The outer damper rings 16 are sealed within the oil damper cavity 17 with an inner damper ring 18 and radially sliding seals 19. The oil damper cavity 17 is filled with oil injected under pressure through the oil inlet 20.

The penetration of oil between damper rings can be inhibited by inertia and by the surface tension of the oil coating the adjacent ring surfaces which can cause the rings sticking together. Especially during start-up of the pressurized oil circulating system, there may be difficulty in oil passing between damper rings. As a result oil film formation may be impeded.

As seen in FIGS. 3-4, each outer damper ring 16 includes circumferentially spaced apart rows of spacer bosses 21 disposed at each axial end in an outer cylindrical surface. The spacer bosses 21 serve to separate the outer damper rings 16 and allow oil to penetrate into the gap formed between the coaxial nested outer damper rings 16.

To distribute oil radially to each cylindrical surface of the outer damper rings 16 from the oil inlet 20 throughout the coaxial outer damper rings 16, the outer damper rings 16 can include a radial oil channel 22 through a central portion of each outer damper ring 16. The inner damper ring 18 serves as the outer race for the roller bearings 14 and also includes spacer bosses 23 to form an oil filled gap with the adjacent outer damper ring 16. To distribute oil circumferentially about the surfaces of the outer damper rings 16, a circumferential oil distribution channel 24 can be provided in each outer damper ring 16. The inner damper ring 18 can include an oil drainage channel 32 to receive and distribute oil between the inner damper ring 18 and the adjacent outer damper ring 16. Oil will flow in the gap between the spaced apart spacer bosses 21, 23 and past the radial sliding seals 19 into the area surrounding the roller bearings 14. Oil is scavenged from the bearing housing 12 and recycled by the oil circulating system of the engine.

Referring to FIG. 2, the annular oil damper cavity 17 is defined within the bearing housing 12 bounded by a radially outward wall 25, a first radially extending side wall 26 and a second radially extending side wall 27. The inner damper ring 18 has axial ends abutting the first and second radially extending side walls 26, 27 and is sealed with radially sliding seals 19 to contain the pressurized oil. The outer damper rings 16 are coaxially nested between the inner damper ring 18 and the radially outward wall 25. Each outer damper ring 16 has axial ends adjacent the first and second radially outward walls 26, 27 of the annular damper cavity 17.

As shown in FIG. 3, each outer damper ring 16 has an outer cylindrical surface and an inner cylindrical surface that is coated with oil. The oil coating is retained in the gap between the outer damper rings 16 maintained by the spacer bosses 21 and 23. Each spacer boss 21 disposed at each axial end of the outer damper rings 16 has a contact surface extending radially beyond the outer surface of an associated outer damper ring 16 and engaging the inner surface of an adjacent outer damper ring 16 defining an oil filled gap there between.

The spacer bosses 21, 23 can be formed by stamping, staking or cold working, or can be added to the cylindrical surface using welding or additive manufacturing. The spacer bosses 21, 23 should be relatively short circumferentially to avoid interfering with the radial stiffness and flexible movement of the outer damper rings 16. For example FIG. 4 shows the spacer bosses 21 as a raised circular disc but oblong or oval shapes can be used as well.

In the example shown in FIGS. 2-3, the oil inlet 20 includes a flow restrictor ring 28 between the supply bore 29 to the oil inlet 20 and the outer damper rings 16. The flow restrictor ring 28 directs the flow of oil and controls oil pressure to the annular oil damper cavity 17. As seen in FIG. 3, the inner damper ring 18 can include an anti-rotation tab 30 engaged in a radially extending oil gallery 31 within the annular damper cavity 17.

Accordingly supplying oil to the multi-film oil damper 15 includes providing a plurality of coaxial nested outer damper rings 16 disposed in an oil damper cavity 17 of the bearing housing 12 and sealed with an inner damper ring 18. The oil damper cavity 17 is flooded with oil under pressure via the oil inlet 20. The coaxial nested outer damper rings 16 are spaced apart with spacer bosses 21 to define oil filled gaps adjacent to each cylindrical surface of each outer damper ring 16. A radial oil channel 22 is provided through a central portion of each outer damper ring 16 in fluid communication with the oil inlet 20 to distribute oil radially within the annular oil damper cavity 17. A circumferential oil distribution channel 24 on each outer damper ring 16 can distribute oil circumferentially.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A multi-film oil damper for accommodating radial movement of a rotary shaft bearing relative to a bearing housing, the multi-film oil damper comprising:
   a plurality of coaxial nested outer damper rings disposed in an oil damper cavity of the bearing housing and sealed with an inner damper ring, the oil damper cavity having an oil inlet;
   each outer damper ring including a first and a second circumferential array of spacer bosses respectively disposed at a first axial end and a second axial end of the coaxial nested outer damper rings, and feed holes extending radially across respective ones of the coaxial nested outer damper rings, the feed holes being aligned at one axial location between the first and second circumferential arrays of spacer bosses to form a straight radial oil channel at a central axial location between the first and the second circumferential arrays of spacer bosses, the straight radial oil channel in fluid communication with the oil inlet.

2. The multi-film oil damper according to claim 1 wherein each of the plurality of coaxial nested outer damper rings includes a circumferential oil distribution channel, the circumferential oil distribution channel being axially aligned with the straight radial oil channel.

3. The multi-film oil damper according to claim 1 wherein the inner damper ring has an oil drainage channel axially aligned with the straight radial oil channel.

4. The multi-film oil damper according to claim 1 wherein the spacer bosses includes at least one of: a stamped metal boss; a staked boss; a welded boss and an additive manufactured boss, and wherein the spacer bosses have a raised circular or oval shape.

5. The multi-film oil damper according to claim 1 further comprising a flow restrictor between the oil inlet and the plurality of coaxial nested outer damper rings, the flow restrictor including a flow restrictor ring mounted in annular damper cavity radially outwardly of the plurality of coaxial nested outer damper rings.

6. The multi-film oil damper according to claim 1 wherein the inner damper ring includes an anti-rotation tab engaged in a radially extending oil gallery within the annular damper cavity.

7. The multi-film oil damper according to claim 1 wherein the inner damper ring is an outer race of a rotary shaft bearing, the outer race having opposed axial ends carrying respective radially sliding seals mounted for engagement with opposed radially extending side walls of the annular damper cavity.

8. A multi-film oil damper in a gas turbine engine, comprising:
- a housing defining an annular damper cavity having an oil inlet in communication with a source of pressurized oil;
- a plurality of nested damper rings disposed within the annular damper cavity, the plurality of nested damper rings defining a plurality of squeeze film annuli, the nested damper rings having respective radially inner surfaces and radially outer surfaces;
- first and second circumferential arrays of spacer bosses between adjacent damper rings of the plurality of nested damper rings, the first and second circumferential arrays of spacer bosses being respectively disposed at a first axial end and a second axial end of the plurality of nested damper rings, the spacer bosses extending between the radially outer surfaces and the radially inner surfaces of the adjacent damper rings; and
- feed holes extending radially across respective ones of the nested damper rings, the feed holes being aligned at one axial location between the first and second circumferential arrays of spacer bosses to form a straight radial oil channel across the plurality of nested damper rings, the straight radial oil channel in fluid communication with the oil inlet.

9. The multi-film oil damper according to claim 8 wherein each of the plurality of nested damper rings includes a circumferential oil distribution channel, the circumferential oil distribution channel being disposed at said one axial location between the first and second circumferential arrays of spacer bosses.

10. The multi-film oil damper according to claim 8 wherein the plurality of nested damper rings includes a radially innermost damper ring having an oil drainage channel, the oil drainage channel being disposed at said one axial location between the first and second circumferential arrays of spacer bosses.

11. The multi-film oil damper according to claim 10 wherein the radially innermost damper ring includes an anti-rotation tab engaged in a radially extending oil gallery within the annular damper cavity.

12. The multi-film oil damper according to claim 10 wherein the radially innermost damper ring is an outer race of a rotary shaft bearing, the outer race having opposed axial ends carrying respective radially sliding seals mounted for engagement with opposed radially extending side walls of the annular damper cavity.

13. The multi-film oil damper according to claim 8 wherein the spacer bosses includes at least one of: a stamped metal boss; a staked boss; a welded boss and an additive manufactured boss, and wherein the spacer bosses have a raised circular or oval shape.

14. The multi-film oil damper according to claim 8 further comprising a flow restrictor between the oil inlet and the plurality of nested damper rings, the flow restrictor including a flow restrictor ring mounted in annular damper cavity radially outwardly of the plurality of nested damper rings.

* * * * *